United States Patent
Nast et al.

(10) Patent No.: US 8,718,052 B2
(45) Date of Patent: May 6, 2014

(54) METHOD FOR CONNECTING SIGNAL PATHS, AND FUNCTION GROUP DESIGNED THEREFOR

(75) Inventors: Helmut Nast, Berlin (DE); Christoph Gebauer, Berlin (DE); Raimo Jacobi, Berlin (DE)

(73) Assignee: Funkwerk Dabendorf GmbH, Dabendorf (DE)

( * ) Notice: Subject to any disclaimer, the term of this patent is extended or adjusted under 35 U.S.C. 154(b) by 17 days.

(21) Appl. No.: 13/381,726

(22) PCT Filed: Jun. 24, 2010

(86) PCT No.: PCT/DE2010/050040
§ 371 (c)(1),
(2), (4) Date: Mar. 26, 2012

(87) PCT Pub. No.: WO2011/000369
PCT Pub. Date: Jan. 6, 2011

(65) Prior Publication Data
US 2012/0170519 A1    Jul. 5, 2012

(30) Foreign Application Priority Data
Jun. 30, 2009    (DE) .......................... 10 2009 027 358

(51) Int. Cl.
*H04L 12/50* (2006.01)
(52) U.S. Cl.
USPC .......................................... 370/360; 370/351
(58) Field of Classification Search
USPC .......... 370/217–221, 225, 227, 228, 351, 360
See application file for complete search history.

(56) References Cited

U.S. PATENT DOCUMENTS

| | | | |
|---|---|---|---|
| 2002/0015173 A1* | 2/2002 | Miura et al. | 358/1.13 |
| 2010/0291915 A1 | 11/2010 | Nast et al. | |
| 2011/0116422 A1 | 5/2011 | Nast | |
| 2013/0120067 A1* | 5/2013 | Nakamura et al. | 330/278 |

FOREIGN PATENT DOCUMENTS

| | | |
|---|---|---|
| DE | 195 36 640 A1 | 3/1997 |
| DE | 10 2006 010 963 A1 | 9/2007 |
| DE | 10 2007 004 911 A1 | 8/2008 |
| DE | 10 2008 040 395 B3 | 11/2009 |
| EP | 1 841 083 A2 | 10/2007 |
| WO | 2008/089755 A1 | 7/2008 |

* cited by examiner

*Primary Examiner* — Brenda H Pham
(74) *Attorney, Agent, or Firm* — Laurence A. Greenberg; Werner H. Stemer; Ralph E. Locher

(57) ABSTRACT

A method and system for connecting signal paths in a circuit arrangement with multiband capability for processing and/or influencing signals in radio communication, on the basis of which at least the transmission paths of a corresponding circuit arrangement are activated or deactivated on the basis of the presence of a transmitted signal from a terminal which is operated with the circuit arrangement. The transmission paths, which are deactivated in a basic state of the circuit arrangement, are periodically checked in succession for the presence of a transmitted signal from the terminal with a multiplexer that forms a functional component of a detection unit and that is switched through by a controller for sequential scanning of the transmission paths for the presence of such a transmitted signal. If a signal is present, only a transmission path for the correct frequency band of the transmitted signal is activated and continuously checked for the presence of a transmitted signal.

9 Claims, 3 Drawing Sheets

METHOD FOR CONNECTING SIGNAL PATHS, AND FUNCTION GROUP DESIGNED THEREFOR

BACKGROUND OF THE INVENTION

Field of the Invention

The invention relates to a solution which is used to switch signal paths in a circuit arrangement for processing and/or influencing signals in radio communication to active or inactive on the basis of the presence of a transmission signal from a communication terminal operated with the relevant circuit arrangement. It relates to an appropriate method and to a function group which is designed for carrying out the method and which is a direct part of the circuit arrangement with the signal paths to be switched or is associated with such a circuit arrangement in terms of circuitry.

In circuit arrangements which are used for processing and/or influencing signals in radio communication, it is in some cases necessary—depending on the design and purpose of such circuit arrangements—to activate or deactivate respective different signal paths in the relevant circuit arrangement to correspond to a respective operating state. In this context, respective signal paths in such a circuit arrangement can be activated and deactivated on the basis of the presence of a transmission signal from a communication terminal (subsequently also called a terminal to simplify matters) operated with the circuit arrangement, for example.

By way of example, in connection with the use of hands free devices for the operation of communication terminals or terminals, namely mobile radios, in motor vehicles, it is thus known practice to compensate for the attenuation which occurs between an external antenna and the mobile radio when the mobile radio is operated with the hands free device by means of special circuit arrangements designed for this purpose. Such circuit arrangements are described by DE 195 36 640 A1 and DE 10 2006 010 963 A1, for example. The circuit arrangements described in the aforementioned documents are used to compensate for the attenuation which is encountered by the signals incoming for a mobile radio operated with the circuit arrangement and the signals outgoing from the relevant mobile radio on the path between the external antenna and the mobile radio. In this case, they are designed such that a transmission path—which is used for amplifying transmission signals from the mobile radio—in the relevant circuit arrangement for compensating for attenuation is active only when a transmission signal outgoing from the mobile radio is present. So long as the mobile radio operated with the circuit arrangement receives only mobile radio signals or, to a certain degree, awaits incoming mobile radio signals but itself does not transmit any signals, the transmission path associated with this mobile radio in the circuit arrangement is inactive insofar as at least the relevant signal path is interrupted and possibly also the amplifier(s) arranged therein, namely a preamplifier and a transmission or power amplifier, for example, are switched off for RF signals.

The first document relates to a circuit arrangement of the generic type for use with mobile radios which can be operated in the GSM network, whereas the circuit arrangement described in the second document supports various mobile radio networks and therefore has multiband capability. A common feature of both solutions is that some of the transmission power which is output by the mobile radio operated with the respective circuit arrangement is decoupled by means of an RF coupler and the presence of a transmission signal is detected by means of threshold value formation. When prompted by the detection circuits and an evaluation unit associated therewith, appropriate RF switching means are then operated which cause the circuit arrangement to adopt the switching state provided for the respective operating state.

It has been found that the prerequisites under which a transmission signal is identified are very different for the different mobile radio standards. In this respect, a relatively high level of circuit complexity is required for circuit arrangements with multiband capability which are suitable for selective operation with mobile radios on different mobile radio networks in order to ensure that, irrespective of the mobile radio network which is currently being used, a transmission signal from the respective mobile radio operated with the circuit arrangement is always identified reliably. In this context, it should be borne in mind that it may even be possible to selectively operate mobile radios on different mobile radio standards with the relevant circuit arrangements having multiband capability, as a result of which, when an appropriate terminal or mobile radio is connected, it is not known what frequency band it operates in.

DE 10 2008 040 395 proposes a detection circuit which significantly increases the reliability of detection of a transmission signal from a mobile radio operated on a circuit arrangement for attenuation compensation which is equipped with this detection circuit. The relevant detection circuit is designed such that the entire level of the transmission signal is used for detecting the transmission signal from the mobile radio. In the case of a circuit arrangement with multiband capability, however, one such detection circuit needs to be allocated to each transmission path for a frequency band which is supported by the relevant circuit arrangement. In this respect, although the use of the detection circuit described in the document increases the reliability of detection of the transmission signal from a respective mobile radio operated with the circuit arrangement for attenuation compensation, the necessary circuit complexity is still considerable. In addition, the detection circuits associated with the individual transmission paths are each designed for the specific frequency band of the relevant transmission path. This restricts the flexibility of the circuit arrangement in respect of any matching to the requirements of future mobile radio standards. Even when other radio standards, such as W-LAN or Wimax, are factored in, the circuit arrangement needs to be extended by detection circuits which are set up or designed specifically for these radio transmission standards.

BRIEF SUMMARY OF THE INVENTION

It is an object of the invention to provide a solution which allows increased flexibility in respect of the detection of transmission signals for different radio standards in connection with the switching of signal paths in circuit arrangements for processing and/or influencing signals in radio communication, which switching takes place on the basis of the presence of a transmission signal. In this respect, the relevant solution is intended to ensure the reliable detection of the transmission signal from a communication terminal which is operated with a circuit arrangement of the aforementioned type which supports multiple radio standards and frequency bands, without this requiring knowledge of which of the radio standards supported by the circuit arrangement the communication terminal uses and without this resulting in increased complexity in terms of circuitry. In this regard, a method and an apparatus are specified.

The object is achieved by a method having the features of the main claim. A function group which achieves the object, which is designed as part of a circuit arrangement for processing and/or influencing signals in radio communication or can be allocated to such a circuit arrangement, is characterized by the first apparatus-oriented claim or material claim. Advantageous embodiments and developments of the invention are provided by the respective subclaims.

The method, proposed for achieving the object, for switching signal paths in a circuit arrangement for processing and/or influencing signals in radio communication is a method according to which at least the transmission paths in such a circuit arrangement are switched to active or inactive on the basis of the presence of a transmission signal from a terminal for radio communication which is operated with the circuit arrangement. In this context, the solution is based on a circuit arrangement which supports a plurality of frequency bands used in radio communication. Examples which can be cited in this respect are the different frequency bands which are customary in mobile radio. In this respect, the cited terminal is a mobile radio, for example, the invention not being limited to this. On the contrary, the invention also relates to the switching of signal paths for processing and/or influencing radio signals from the Wimax or W-LAN radio standard, for example. Furthermore, it can also be transferred to circuit arrangements for future radio standards.

As already explained, the proposed solution allows the switching of signal paths in an appropriate circuit arrangement, namely at least the transmission paths thereof, on the basis of the presence of a transmission signal from a terminal which is operated with the circuit arrangement and which operates in at least one of a plurality of frequency bands supported by the circuit arrangement.

According to the invention, the method is designed such that the transmission paths, which are deactivated in a basic state of the circuit arrangement and which differ form one another at least insofar as they are designed for transmitting transmission signals in different frequency bands and are therefore equipped with appropriate band selection means, such as filters and the like, are checked periodically in succession for the presence of transmission signal from a terminal which is currently being operated with the circuit arrangement. According to the invention, the presence of such a transmission signal prompts only that transmission path which is correct or designed for the frequency band of said transmission signal to be activated and then only this transmission path to continue to be checked for the presence of a transmission signal. In this case, the activated transmission path is subsequently checked constantly for the presence of a transmission signal. As soon as the transmission signal is absent, however, the relevant transmission path is deactivated again and, following deactivation thereof, the periodic check on all transmission paths for the presence of a transmission signal from the terminal which is operated with the circuit arrangement for processing and/or influencing the radio signals, for example a mobile telephone, is continued. In this context, the activation of a signal path, such as a transmission path, is intended, as already indicated at the outset, to be understood to mean operation of switching means in the circuit arrangement, as a result of which this path is connected to the signal path, that is to say is switched through. Preferably, the activation of a signal path furthermore possibly comprises switching on amplifiers arranged in said signal path in respect of RF. Accordingly, it is conversely true that the deactivation of a signal path involves the signal flow through this path being interrupted and preferably amplifiers arranged in the path being switched off in respect of RF.

According to the basic concept of the invention, the transmission paths of the circuit arrangement which uses the method are accordingly scanned for the presence of a transmission signal from the terminal operated with the circuit arrangement in constant succession, to a certain extent using a kind of polling mode. This procedure results directly in reduction of the complexity in terms of circuitry, since it is now no longer necessary to provide a separate detector for each transmission path. On the contrary, all transmission paths are checked by means of one detector to which signal levels tapped off from the respective transmission paths are supplied in continual succession until a transmission signal from the terminal is detected, in order to check said signal levels to determine whether they represent a transmission signal. In addition, the invention allows the implementation of universal circuit concepts, with the respective specific design in terms of circuitry being able to be matched very easily to the number and type of the frequency bands which are intended to be supported by the circuit arrangement.

A respective transmission signal is preferably detected by means of a threshold value comparison. In this case, the method is preferably designed such that a decision about whether one of the transmission paths has a signal level which can be interpreted as a transmission signal is made only after the signal levels of all signal paths have been evaluated. As a result, if a signal level which is situated above the respective threshold value is detected in more than one path, it is possible to take account of just the signal level which is strongest in respect of the respective threshold value on a transmission path and thus to disregard any interference levels on other transmission paths. Accordingly, also no earlier than after all transmission paths in the circuit arrangement have been scanned for a transmission signal at least once, a transmission path is activated provided that a transmission signal has been detected as the result of the scan. Only then does the respective circuit arrangement adopt the operating state which is intended for this case. If the signal level in the transmission path which is then activated and constantly checked further for the presence of a transmission signal drops below a likewise prescribed value, the relevant transmission path is deactivated again and the periodic check on all transmission paths for the presence of a transmission signal is continued. In this case, the method is designed such that there is provision for a hysteresis between the signal level which is interpreted as an active transmission signal resulting in a change in the operating state of the circuit arrangement and the signal level for which the relevant transmission path switched to active upon the occurrence of the transmission signal is deactivated again.

The method can also be developed by virtue of the power of the signal being measured in the course of the detection of the transmission signal or the check on the continuous presence thereof. The respective power ascertained in this case can possibly be used for setting further parameters of the circuit.

An embodiment of the invention which has particular relevance to practice relates to a method according to which the presence of a transmission signal is taken as a basis for switching both transmission paths and reception paths in an appropriate circuit arrangement for processing and/or influencing signals in radio communication to active or inactive. For such circuit arrangements, it is known practice to provide a basic state, which is adopted in the absence of a transmission signal from a terminal which is operated with said circuit arrangements, which basic state has a reception path activated which allows the reception of incoming signals in all frequency bands and radio standards supported by the circuit arrangement. In this basic state, it is therefore possible for any terminal which can be operated with the circuit arrangement to receive incoming signals. In this respect, the circuit arrangement in this basic state is to a certain extent transparent to signals from all frequency bands and radio standards which the circuit arrangement supports. For the implementation with such a circuit arrangement, the method is designed such that the (transparent) reception path, which is activated in the basic state of the circuit arrangement until a transmission signal is detected, is deactivated for a respective brief period while a respective transmission path is being checked for the presence of a transmission signal. This prevents, by way of example, the transmission signal from another terminal operated in the vicinity of the circuit arrangement—which transmission signal is received by the circuit arrangement and enters one of the transmission paths of the circuit arrangement on account of crosstalk which is not totally avoidable—from being incorrectly interpreted as a transmission signal from the terminal which is operated directly on or with the circuit arrangement. A transmission signal from the terminal which is operated with the circuit arrangement is accordingly present only when such a signal can also be detected during the brief deactivation of the transparent reception path in the circuit arrangement.

The function group provided for achieving the object may be designed as part of a circuit arrangement for processing and influencing signals in radio communication or at least transmission signals from the terminal operated with the relevant circuit arrangement or else may be associated with such a circuit arrangement as a peripheral function group. The function group comprises a detection unit having a detector for detecting a transmission signal from the terminal, electronic switching means and a controller for evaluating signals from the detection unit and also for controlling the aforementioned switching means. By way of example, the circuit arrangement for processing and/or influencing signals in radio communication—which circuit arrangement has already been addressed on multiple occasions—may be a circuit arrangement compensating for attenuation. By way of example, such circuit arrangements are used to compensate for the attenuation which occurs between the external antenna and the mobile radio when a mobile radio is operated on a hands-free device with an external antenna. In this case, the reception paths of the circuit arrangement are also switched in accordance with the respective operating state thereof or on the basis of the frequency band in which the mobile radio respectively operated with the circuit arrangement operates. In the case of the function group according to the invention, one of the switching means operated by the controller is a multiplexer in the form of part of the detection unit. This multiplexer in the detection unit is connected by the controller of the functional unit periodically for the purpose of sequentially scanning the transmission paths for the presence of a transmission signal from the terminal until a transmission signal from the terminal operated on the relevant circuit arrangement is detected. This multiplexer is accordingly used to supply the signal levels of the individual transmission paths to the actual detector—to a certain extent in continuous circulation—in succession for the purpose of assessment, that is to say for the purpose of checking for the presence of a transmission signal. If a transmission signal is detected, the multiplexer in the detection unit adopts a switching position in which the correct transmission path for the frequency band of the detected transmission signal in the circuit arrangement, which transmission path is activated by the controller of the function group, is continually checked by means of the detector for the presence of a transmission signal. In this position, only the relevant activated transmission path is then checked for the presence of a transmission signal from the terminal, while the other inactive transmission paths are no longer scanned by the detection unit for the duration of the presence of a transmission signal in the activated transmission path. However, as soon as the transmission signal is absent from the activated transmission path, the relevant transmission path is deactivated again and the periodic connection of the multiplexer in the detection unit is restarted.

Where the text above and the patent claims state that the aforementioned multiplexer is in the form of part of the detection unit, this refers to a functional view. The multiplexer is accordingly a functional, and not necessarily also an integral, part of the detection unit. It may accordingly also be only associated with or adjunct to the detection unit in physical terms, with the multiplexer being able, in view of its function, to sequentially supply the detector with the levels from the transmission paths of a circuit arrangement equipped on the basis of the principle according to the invention in order to check them for the presence of a transmission signal, in any case being able to be regarded as a functional part of the detection unit.

As already explained, the functional unit according to the invention is preferably designed for use with circuit arrangements for compensating for attenuation in which the presence of a transmission signal from a terminal operated with said circuit arrangements is taken as a basis for activating or deactivating preferably both transmission paths and reception paths in the relevant circuit arrangement. In an embodiment of the functional unit which is suitable for this purpose, the multiplexer, which is in the form of (functional) part of the detection unit, is connected by the controller in sync and in correspondence with a multiplexer arranged at the terminal end, by means of which a respective one of a plurality of transmission paths in the circuit arrangement which are designed for the transmission of transmission signals in different frequency bands and which are combined at the output end is connected to the terminal, until a transmission signal from the terminal is detected. In this context, correspondence means that the multiplexer in the form of part of the detection unit is switched such that the respective signal path which is connected to the terminal by means of the multiplexer at the terminal end is also checked for the presence of a transmission signal.

In accordance with one particularly preferred embodiment of the invention, the multiplexer of the detection unit has two switching positions for each transmission path of the circuit arrangement operated with the function group. In the absence of a transmission signal, the multiplexer of the detection unit is in this case connected periodically such that it briefly always adopts only the first switching position for the individual transmission paths. In this respective first switching position, the detector of the detection unit is supplied with the entire signal level from the respectively scanned transmission path for the purpose of evaluation. If the signal supplied to the detector is now identified as a transmission signal, the relevant transmission path is activated. That is to say that the transmission path is connected to the signal path between the terminal and the external antenna and possibly furthermore the amplifiers in the relevant transmission path, which are otherwise switched off in respect of RF, are switched on (in respect of RF). In addition, the multiplexer in the detection unit is switched to the second switching position associated with the activated transmission path. In this switching position, an RF coupler is then used to decouple a portion of the already amplified transmission signal and also to check it for the presence of a signal level which can be interpreted as a transmission signal. This measure further increases the reliability of the detection of the transmission signal, since, up until the latter occurs, the detector unit is respectively supplied with the entire level from a transmission path.

In order to ensure that the previously activated transmission path is not deactivated again during the changeover operation from the first switching position, associated with said transmission path in the multiplexer of the detection unit, to the second switching position, associated with it in the multiplexer, the detection unit has a self-hold function which ensures that the changeover operation is not interpreted by the detector as the absence of the transmission signal from the terminal. This self-hold function is implemented in software by a piece of software which is executed by the controller or is implemented in hardware, for example by means of a delaying switching element.

As already explained, the various transmission paths of the circuit arrangement provided with the functional unit according to the invention are combined at the output end. In this context, they are preferably combined by means of an element of the function group according to the invention. According to one preferred embodiment, the latter is likewise a multiplexer which is switched by the controller of the functional unit. If the circuit arrangement provided with the functional unit is a circuit arrangement for compensating for attenuation in the case of both signals incoming for the terminal and signals transmitted by said terminal, this multiplexer is used to switch the reception paths and the transmission paths of the relevant circuit arrangement in accordance with the operating state and true to the frequency band.

Following on from the explanations above, the functional unit according to the invention is, in accordance with one possible embodiment, in the form of an integral part of a circuit arrangement for compensating for attenuation which is designed as described previously.

The invention will be explained in more detail once again below with reference to an exemplary embodiment. In the associated drawings:

DESCRIPTION OF THE INVENTION

Figure 1:
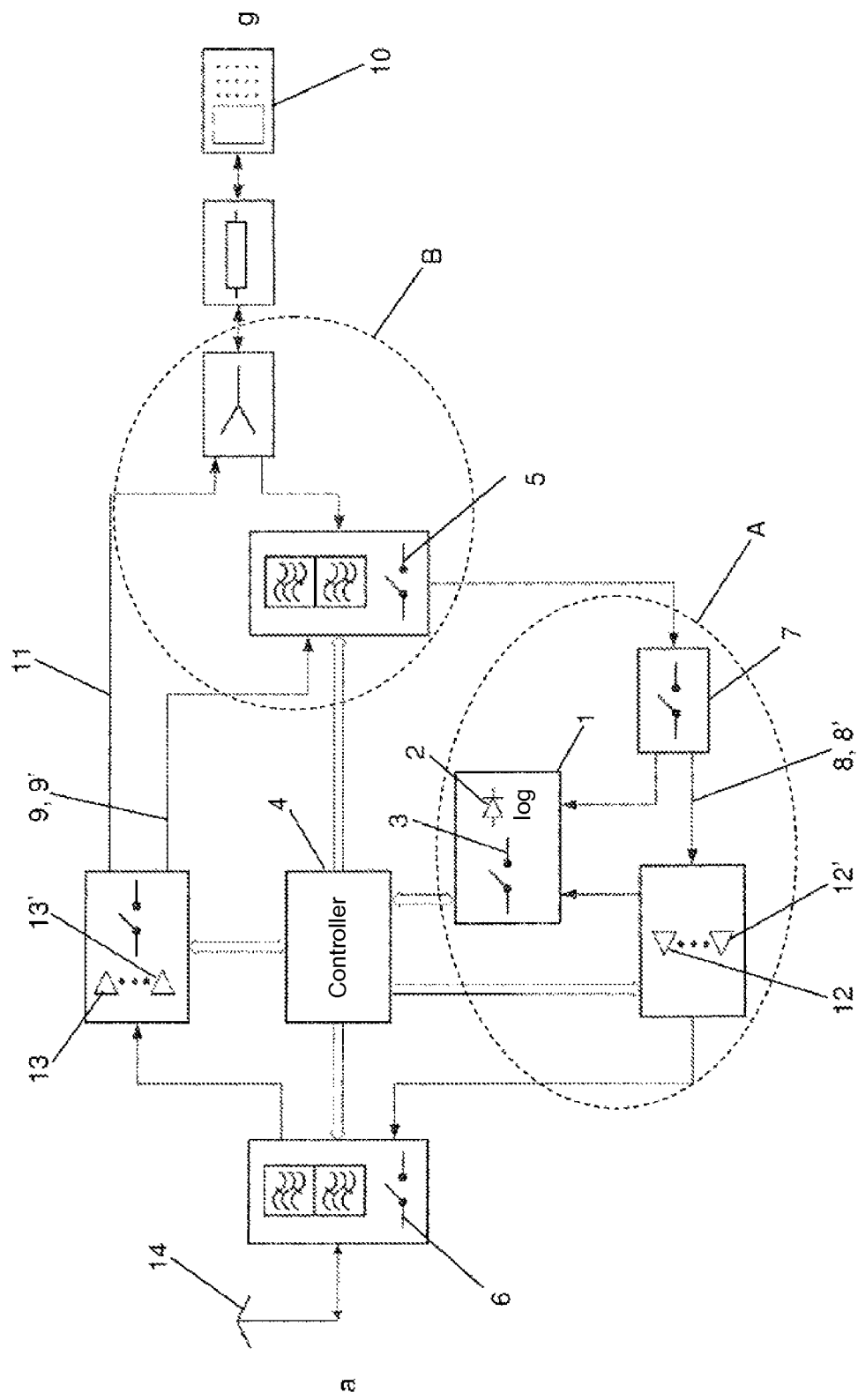
FIG. 1 shows the block diagram of a circuit arrangement equipped with the function group according to the invention.

FIG. 1 shows a coarse block diagram of a circuit arrangement for processing or influencing signals in radio communication. To be more precise, this exemplary embodiment is a circuit arrangement for compensating for attenuation, as can be used in connection with the operation of a mobile radio 10 on a hands-free device equipped with an external antenna 14, for example. This circuit arrangement compensates for the attenuation in the signals which are received and transmitted by the terminal 10 which arises in the signal paths between the terminal 10 or the mobile radio and the external antenna 14. Part of the circuit arrangement shown is the function group according to the invention. The function group according to the invention accordingly essentially comprises a detection unit 1 for detecting a transmission signal from the mobile radio 10 operated with the circuit arrangement, a plurality of switching means 3, 5, 6, 7, particularly multiplexers 5, 6 arranged at the antenna end a and at the terminal end g, and a multiplexer 3—not shown in detail here—in the detection unit 1 (in this regard see FIG. 2) and a controller 4 for evaluating the signals from the detection unit 1 and for controlling the switching means 3, 5, 6, 7 on the basis of the detection result. The circuit arrangement shown, which is equipped with the functional unit according to the invention, supports a plurality of frequency bands. This is symbolized by the two switching symbols for reception amplifiers 13, 13' in the circuit arrangement and the dots between them and also equivalently by the two switching symbols for transmission amplifiers 12, 12' and the dots between them, the dots respectively indicating that a plurality of reception paths 9, 9' and a plurality of transmission paths 8, 8' of basically the same design, that is to say with reception amplifiers 13, 13' and transmission amplifiers 12, 12', respectively, are produced. Thus, such a circuit arrangement supports, by way of example, the receiving and sending of radio signals for mobile radio, such as the US-GSM or GSM850 standard, the GSM900 standard, the GSM1800 standard and the UMTS standard and/or from 3rd generation mobile radio standards for what are known as 3G appliances, with the attenuation to which appropriate signals are subject between the external antenna 14 and the terminal 10 being compensated for by the circuit arrangement.

The switching means 3, 5, 6, 7 operated by the controller 4 can be used to produce different operating states for the circuit arrangement on the basis of the presence of a transmission signal from the mobile radio 10. In a first operating state, the basic state, the circuit arrangement is transparent to radio signals incoming for the mobile radio 10. That is to say that all incoming radio signals within any one of the frequency bands supported by the circuit arrangement can get to and be received by the terminal 10 or mobile radio via an upper reception path 11 without hindrance. At the same time, however, the function group according to the invention is used to constantly check whether the mobile radio 10, for which it is not known which of the frequency bands supported by the circuit arrangement it operates in, is emitting a transmission signal. To this end, the transmission paths 8, 8' of the circuit arrangement are successively checked periodically for the presence of an appropriate transmission signal. This check is controlled by the controller 4 of the function group according to the invention.

The latter connects the multiplexer 3 (in this regard see FIG. 2), which, according to the invention, is arranged in the detection unit 1, and the multiplexer 5 arranged at the terminal end g to one another in sync such that the signal levels for the individual transmission paths 8, 8' are each present in succession on the detection unit 1 or the detector 2 thereof for the purpose of evaluation. If a transmission signal is detected, the correct transmission path 8, 8' for the frequency band of the detected transmission signal is activated. That is to say that the relevant transmission path 8, 8' is connected to the signal path between the mobile radio 10 and the external antenna 14 by means of the multiplexers 5, 6 actuated by the controller 4 and by means of the switching means 7. Furthermore, in the embodiment shown for the circuit arrangement, the transmission amplifier 12, 12'—hitherto not active in respect of RF—in the relevant transmission path 8, 8' is switched on in respect of RF by virtue of appropriate actuation of a switching means, which is not shown in more detail. In the present case, the corresponding switching of the multiplexers 5, 6 by the controller 4 simultaneously activates that reception path 9, 9' of the circuit arrangement which is designed for the relevant frequency band and connects it to the signal path for radio signals which are to be received by the terminal 10 instead of the reception path 11.

Figure 2:
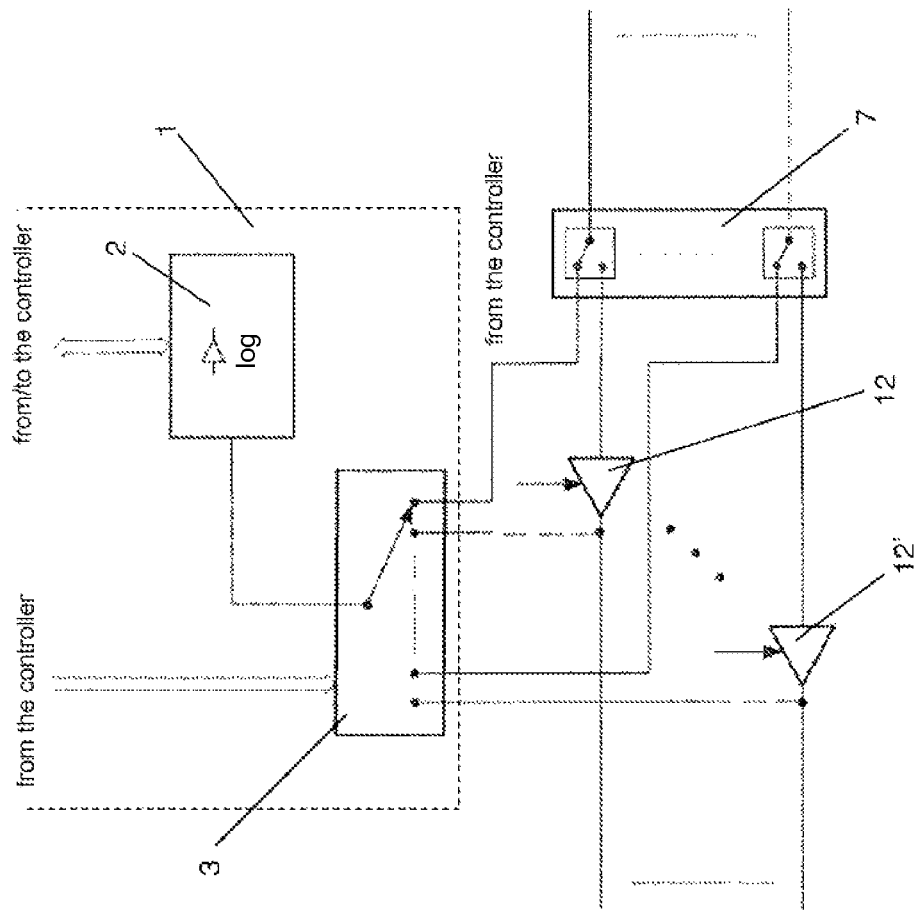
FIG. 2 shows the detail A from the block diagram of the circuit arrangement shown in FIG. 1 with the multiplexer of the detection unit.

FIG. 2 relates to detail A from the circuit arrangement shown in FIG. 1. It shows a portion of the inventive function group (shown here without the controller 4), in the form of part of said circuit arrangement, and the transmission paths 8, 8'—activated or deactivated in accordance with the detection result—with the transmission amplifiers 12, 12'. As part of the function group according to the invention, the detection unit 1 with the detector 2 and with the multiplexer 3 in the form of a functional part of the detection unit 1 are shown. From the figure, it can be seen that the multiplexer 3 in the exemplary embodiment illustrated has two switching positions $S8_1$, $S8_2$, $S8'_1$, $S8'_2$ per transmission path 8, 8' monitored for the presence of a transmission signal, and in this case is operatively connected to the further switching means 7 operated by the controller 4—not shown. In the absence of a transmission signal from the mobile radio 10 operated with the circuit arrangement, the multiplexer 3 in this case is connected periodically such that it is successively always set only to a first switching position $S8_1$, $S8'_1$ provided for each of the transmission paths 8, 8'. In this case, the signal level which is present upstream of the amplifier stage or the amplifier 12, 12' of the respective transmission path 8, 8' is supplied to the detector 2 of the detection unit 1 for the purpose of evaluation. A threshold value comparison is used to check whether this signal level can be interpreted as a transmission signal. If this is the case, the correct transmission path 8, 8' and reception path 9, 9' are activated, as already explained more than once, and furthermore the multiplexer 3 is put into the second switching position $S8_2$, $S8'_2$ associated with the relevant transmission path 8, 8', with the transmission path 8, 8' being activated by changing over at least the relevant switching means 7 arranged upstream of the transmission amplifier 12, 12' in said transmission path. In this switching position $S8_2$, $S8'_2$, a portion of the transmission signal amplified by the transmission amplifier 12, 12' in the relevant transmission path 8, 8' is decoupled by means of an RF coupler—not shown in more detail—at the output of the relevant transmission amplifier 12, 12' and is supplied to the detector 2. Since the multiplexer 3 now remains in this switching position $S8_2$, $S8'_2$ for the duration of the presence of a transmission signal, the decoupled portion of the already amplified transmission signal is therefore used to continually check for the further presence thereof. If no further transmission signal is detected, the circuit is returned to the basic state, that is to say to the transparent mode (reception path 11 activated), as already explained. Appropriate programming of the controller 4 ensures that, after the detection of a transmission signal, the circuit arrangement remains in the operating state adopted for the presence of a transmission signal from the mobile radio 10—reception path 9, 9' and transmission path 8, 8' are activated for the relevant frequency band—while the first switching position $S8_1$, $S8'_1$—for the relevant transmission path—of the multiplexer 3 is changed over to the associated second switching position $S8_2$, $S8'_2$. This therefore produces a self-hold function for the duration of the changeover operation. Preferably, this self-hold function is produced by means of a piece of software processed by the controller 4.

Figure 3:
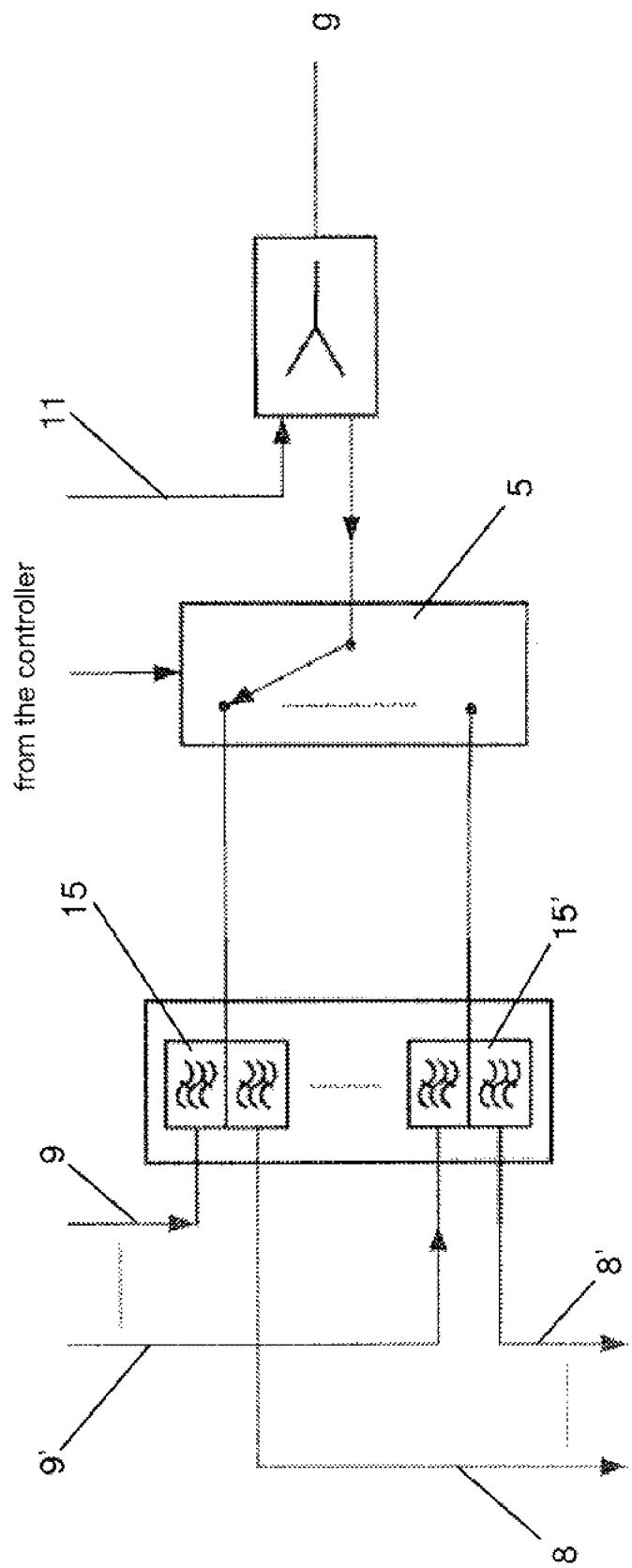
FIG. 3 shows the detail B from the block diagram of the circuit arrangement shown in FIG. 1 with the multiplexer at the terminal end.

FIG. 3 shows the detail B from the circuit arrangement shown in FIG. 1. This shows particularly the multiplexer 5, arranged at the appliance or terminal end g, which is correspondingly used by the controller 4 to connect the multiplexer 3 in the detection unit 1 during the scan pass, that is to say the ongoing sequential check on the transmission paths 8, 8' for the presence of a transmission signal, in the manner already described. FIG. 3 reveals that for each frequency band supported by the circuit arrangement, a duplexer 15, 15' is arranged as part of the terminal-end multiplexer 5 or on the terminal-end multiplexer 5. The duplexers 15, 15' serve as a frequency filter for separating the transmission signal and the received signal for the signal paths of the circuit arrangement which are activated on the basis of the frequency band of the detected transmission signal from the mobile radio 10. In the same way, duplexers for separating the received signal and the transmission signal are likewise arranged as part or on the antenna-end a multiplexer.

LIST OF REFERENCE SYMBOLS

1 Detection unit
2 Detector
3 Switching means, multiplexer
4 Controller
5 Switching means, multiplexer
6 Switching means, multiplexer
7 Switching means
8, 8' Transmission path
9, 9' Reception path
10 Terminal, for example mobile radio
11 Reception path
12, 12' (Transmission) amplifier
13, 13' (Reception) amplifier
14 Antenna
15, 15' Duplexer
$S8_1$, $S8_2$ Switching position
$S8'_1$, $S8'_2$ Switching position
a Antenna end
g Terminal end

The invention claimed is:

1. A method for switching signal paths in a circuit arrangement for processing and/or influencing signals in radio communication, the method which comprises:

switching at least the transmission paths of the relevant circuit arrangement to active state or inactive state for radio communication based on a presence of a transmission signal from a terminal that is operated with said circuit arrangement and which operates in one or more of a plurality of frequency bands that are supported by the circuit arrangement;

periodically checking in succession the transmission paths which are deactivated in a basic state of the circuit arrangement and which are configured to transmit transmission signals in different frequency bands, for the presence of a transmission signal from the respective terminal operated with the circuit arrangement;

if a transmission signal is found to be present, activating only the transmission path for the frequency band of the transmission signal and continuing to check only the said transmission path for the presence of a transmission signal; and deactivating the relevant transmission path, which is constantly checked for the presence of the transmission signal, when the transmission signal is absent; and subsequently to deactivating the relevant transmission path, continuing a periodic check on all transmission paths for the presence of a transmission signal.

2. The method according to claim 1, wherein a detection of a transmission signal comprises comparing a signal level on a respective transmission path with a threshold value that is stipulated for the respective transmission path, wherein a decision about whether one of the transmission paths has a signal level that can be interpreted as a transmission signal and which of the transmission paths may need to be activated as a result is made only after the evaluation of the signal levels of all signal paths, and which comprises setting a hysteresis between the switching time for the activation of a transmission path and the switching time for the deactivation thereof.

3. The method according to claim 1, which comprises, in connection with detecting a transmission signal from the terminal and checking an ongoing presence thereof, measuring a power of the transmission signal.

4. The method according to claim 1, which comprises taking a presence of a transmission signal as a basis for switching both transmission paths and reception paths in a circuit arrangement for processing and/or influencing signals in radio communication to active or inactive, and wherein a reception path which has been activated in the basic state of the circuit arrangement up to the detection of a transmission signal and which is transparent to incoming signals in all frequency bands and radio standards supported by the circuit arrangement is deactivated for a respective brief period while a respective transmission path is being checked for the presence of a transmission signal.

5. An assembly for selectively activating and deactivating signal paths in a circuit arrangement having a plurality of transmission paths for processing and/or influencing at least the transmission signals from a radio communication terminal that is operated with the circuit arrangement, the selected activation and deactivation being based on a presence of a transmission signal from the terminal, comprising:
 a detection unit having a detector for detecting a transmission signal from the terminal;
 electronic switching means and a controller connected to said detection unit for evaluating signals from said detection unit and for controlling said switching means;
 wherein one of said switching means is a multiplexer forming a part of said detection unit and said multiplexer, up to a detection of a transmission signal from the terminal, is periodically connected by said controller for sequentially scanning the transmission paths for the presence of a transmission signal and, following the detection of a transmission signal, adopts a switching position, while a transmission signal is present, in which only a given transmission path for the frequency band of the detected transmission signal then continues to be checked for the presence of a transmission signal, wherein the given transmission path has been activated with said controller by operating an appropriate said switching means, and wherein the given transmission path, which is then being checked constantly for the presence of the transmission signal, is once more deactivated by said controller when the transmission signal is absent and said multiplexer is once more periodically connected.

6. The assembly according to claim 5, configured for selectively activating and deactivating both transmission paths and reception paths in a circuit arrangement for processing and/or influencing signals in radio communication based on a presence of a transmission signal from a terminal operated with the circuit arrangement, wherein said multiplexer is connected by the controller in sync and in correspondence with a multiplexer arranged at the terminal end, by means of which a respective one of a plurality of transmission paths in the circuit arrangement which are designed for the transmission of transmission signals in different frequency bands and which are combined at the output end is connected to the terminal, until a transmission signal from the terminal is detected.

7. The assembly according to claim 5, wherein each transmission path in the circuit arrangement contains at least one amplifier, and wherein said multiplexer has two switching positions per transmission path which is to be scanned for the presence of a transmission signal, wherein the multiplexer is periodically connected, until a transmission signal from the terminal is detected, such that it always adopts only the first switching position associated with each transmission path, in which switching position the signal level which is present upstream of the at least one amplifier in the respective transmission path is applied to the detection unit and wherein the multiplexer, after a transmission signal has been detected, adopts the second switching position, associated with the activated transmission path, for the duration of said transmission signal, in which second switching position a portion of the amplified transmission power which is decoupled downstream of the at least one amplifier in this transmission path is applied to the detection unit, wherein said detection unit has a self-hold function, as a result of which the circuit arrangement remains in the operating state provided for the presence of a transmission signal while said multiplexer is being changed over from a first to a second switching position thereof associated with the activated transmission path.

8. The assembly according to claim 7, which comprises a further multiplexer combining the transmission paths of the circuit arrangement at the output end on an external antenna for the terminal, wherein, if a transmission signal is present, then the correct transmission path for the frequency band of this transmission signal in the circuit arrangement is connected to the external antenna by way of said further multiplexer under control of said controller.

9. The assembly according to claim 7 configured as a part of a circuit arrangement for compensating for the attenuation in radio signals that are received for the terminal and transmitted by the terminal which arises in the signal paths between an external antenna and the terminal.

* * * * *